United States Patent
Reed

(10) Patent No.: US 9,119,508 B2
(45) Date of Patent: Sep. 1, 2015

(54) INTEGRAL CHILD TRAINING TOILET

(71) Applicant: Marcel Reed, Canton, MI (US)

(72) Inventor: Marcel Reed, Canton, MI (US)

( * ) Notice: Subject to any disclaimer, the term of this patent is extended or adjusted under 35 U.S.C. 154(b) by 0 days.

(21) Appl. No.: 14/332,896

(22) Filed: Jul. 16, 2014

(65) Prior Publication Data

US 2015/0021963 A1 Jan. 22, 2015

Related U.S. Application Data

(60) Provisional application No. 61/846,967, filed on Jul. 16, 2013.

(51) Int. Cl.
| | | |
|---|---|---|
| *A47D 1/10* | (2006.01) | |
| *A47C 7/62* | (2006.01) | |
| *A47K 11/04* | (2006.01) | |
| *B60N 2/26* | (2006.01) | |
| *B62B 7/00* | (2006.01) | |
| *B62B 9/00* | (2006.01) | |

(52) U.S. Cl.
CPC . *A47K 11/04* (2013.01); *B60N 2/26* (2013.01); *B62B 7/00* (2013.01); *B62B 9/00* (2013.01)

(58) Field of Classification Search
CPC ............ A47K 11/04; B62B 7/00; B62B 9/00; B60N 2/26
USPC .............................. 297/250.1–256.16, 188.01, 297/188.08–188.13; 4/458, 483, 479, 902
See application file for complete search history.

(56) References Cited

U.S. PATENT DOCUMENTS

| | | | | |
|---|---|---|---|---|
| 550,613 | A * | 12/1895 | Harvey | 297/188.1 X |
| 1,455,255 | A * | 5/1923 | Kapelman | 4/483 |
| 2,245,204 | A * | 6/1941 | La Plante | 4/483 |
| 3,271,784 | A * | 9/1966 | Peffley | 4/483 |
| 4,193,142 | A * | 3/1980 | Henningfield | 4/483 |
| 4,633,536 | A * | 1/1987 | Tribble-DuBose | 4/479 X |
| 5,230,523 | A * | 7/1993 | Wilhelm | 297/250.1 X |
| 5,359,737 | A * | 11/1994 | Hodge | 4/483 |
| 5,685,029 | A * | 11/1997 | Gee | 4/483 |
| 5,734,998 | A * | 4/1998 | Simmons | 4/483 X |
| 5,775,771 | A * | 7/1998 | La Cour et al. | 297/188.11 X |
| 5,779,306 | A * | 7/1998 | Ohlsson | 297/256.16 |
| 5,781,939 | A * | 7/1998 | Bledsoe | 4/483 |
| 5,787,518 | A * | 8/1998 | Mendelovich et al. | 4/483 X |
| 5,893,178 | A * | 4/1999 | Wosiek | 4/483 |
| 5,926,864 | A * | 7/1999 | Lynch | 4/483 |
| 5,978,976 | A * | 11/1999 | Chai | 4/483 |
| 5,991,938 | A * | 11/1999 | Bonior | 4/483 X |
| 6,029,289 | A * | 2/2000 | Jakobson et al. | 4/483 |
| 6,038,711 | A * | 3/2000 | Clarke | 4/902 X |
| 6,052,840 | A * | 4/2000 | West et al. | 4/483 X |
| 6,240,576 | B1 * | 6/2001 | Cosby | 4/483 |
| 6,684,418 | B2 * | 2/2004 | Choi | 4/483 |
| 6,742,195 | B1 * | 6/2004 | Parry | 4/483 X |
| 6,829,788 | B1 * | 12/2004 | Allen | 4/483 |
| 6,997,509 | B2 * | 2/2006 | Kain | 297/250.1 |
| 7,073,212 | B1 * | 7/2006 | Moffat | 4/483 X |
| 7,237,278 | B1 * | 7/2007 | Scott | 4/483 |

(Continued)

*Primary Examiner* — Rodney B White
(74) *Attorney, Agent, or Firm* — Thomas P. Heed

(57) ABSTRACT

An integral training potty comprised of a child safety seat and waste collection apparatus, allowing a small child to evacuate his or her bowel or bladder. The waste collection apparatus being removable, without disturbing or removing the seated child. The waste collection apparatus optionally having a liner for the waste collection bowl. Alternately, the present invention is an integral training potty comprised of a child's stroller and a waste collection apparatus.

10 Claims, 6 Drawing Sheets

(56) References Cited

U.S. PATENT DOCUMENTS

| | | | |
|---|---|---|---|
| 7,313,833 B2* | 1/2008 | Wee | 4/458 |
| 7,665,157 B2* | 2/2010 | Deutsch | 4/483 |
| 7,770,242 B2* | 8/2010 | Sell | 4/484 |
| 7,865,980 B1* | 1/2011 | Fuller et al. | 4/483 |
| 7,891,030 B1* | 2/2011 | Sutton | 4/483 |
| D652,640 S * | 1/2012 | Daniel | D6/333 |
| 8,495,771 B1* | 7/2013 | Damman | 4/483 |
| 8,894,148 B2* | 11/2014 | Bailey | 297/250.1 |
| 2003/0066126 A1* | 4/2003 | Armbruster et al. | 4/483 |
| 2004/0133971 A1* | 7/2004 | Davis et al. | 4/483 |
| 2006/0150313 A1* | 7/2006 | Thomas | 4/483 |
| 2007/0017015 A1* | 1/2007 | Finell | 4/483 |
| 2008/0263756 A1* | 10/2008 | Marsden | 4/483 |
| 2010/0301639 A1* | 12/2010 | McPheeters | 297/256.1 |
| 2011/0030134 A1* | 2/2011 | Dubiel | 4/483 |
| 2011/0061157 A1* | 3/2011 | Goergen | 4/483 |
| 2011/0131718 A1* | 6/2011 | Smith | 4/483 |
| 2011/0214228 A1* | 9/2011 | Rosser | 4/483 |
| 2012/0084908 A1* | 4/2012 | Dunn et al. | 4/483 |
| 2012/0084909 A1* | 4/2012 | Dunn et al. | 4/483 |
| 2013/0198946 A1* | 8/2013 | Ondaatje et al. | 4/483 |
| 2013/0283515 A1* | 10/2013 | Schilpp et al. | 4/483 |
| 2014/0068851 A1* | 3/2014 | Rosser | 4/483 |
| 2014/0259354 A1* | 9/2014 | Sundberg et al. | 4/483 |
| 2014/0265487 A1* | 9/2014 | Michelson | 297/256.11 |
| 2015/0082532 A1* | 3/2015 | Marsden et al. | 4/483 |

* cited by examiner

INTEGRAL CHILD TRAINING TOILET

FIELD OF INVENTION

This invention relates both to the classes of dry-closets and chairs and seats. Specifically, this invention relates to portable toilets and child safety seats.

BACKGROUND OF INVENTION

Training young children ("Toddlers") to use a toilet ("Potty-training") is a ubiquitous task of child-rearing. Unfortunately, it is an activity that is, to this day, still imprecise and prone to error. During Potty-training, Toddlers are often unaware of the physical cues that indicate the bowel or bladder needs to be evacuated. As a result, taking a Toddler on even the shortest outing or errand is often a risk. Many parents find such excursions with a Potty-training Toddler to be nerve-racking.

The market has attempted to address this need with many imperfect solutions. A survey of the current prior art shows several attempts to address the problem with a portable training toilet. For example, U.S. Pat. No. 5,309,580 by named inventors Amalsad, et. al., granted on May 10, 1994, is entitled, "Combination portable children's toilet and toilet trainer" ("Amalsad '580"). Amalsad '580 discloses a small training toilet, or dry closet, with detachable legs, intended for use with a Potty-training Toddler. The small training toilet disclosed by Amalsad '580 has collapsible legs, which retract and store underneath the dry closet. Otherwise, the training toilet is rigid and fixed. Amalsad '580 does not disclose a receptacle for Toddler waste. In fact, FIG. 1 shows that the invention is open from the seat to the legs. Regardless, it is assumed that the invention, as practiced, had some means for collecting waste. Nonetheless, Amalsad '580 is an imperfect solution as an aid to parents Potty-training Toddlers, because it is bulky, cumbersome, and would need to be transported with the child, as a separate piece of personality.

Another attempting to transport Potty-training Toddlers is U.S. Pat. No. 5,903,932 by named inventors Whitesel, granted on May 18, 1999, and entitled, "Portable toilet with disposable liner" ("Whitesel '932"). Whitesel '932 discloses a portable toilet that has three main parts, which latch together. The portable toilet is intended for use with a Potty-training Toddler. The center part of the invention is a waste receptacle. Whitesel '932 discloses a liner for use in the waste receptacle, to collect the Toddler's waste. The invention disclosed by Whitesel '932 is bulky, cumbersome, and would need to be transported with the child, as a separate piece of personality.

U.S. Pat. No. 6,240,576 by named inventor Cosby, issued on Feb. 26, 2008 Jun. 5, 2001, entitled, "Portable toilet" ("Cosby '576") teaches a portable toilet that does not fold-up into a smaller space. The portable toilet has a base, a seating surface, and a back. The seating surface has a hole in it, to allow waste to pass. The waste collection is performed with a bag. The hold can be sealed, with a separate cover that requires the Toddler to get off the seat while the cap is put in place. In order to remove the waste or seal the waste, the Toddler must get off the seat. The seating surface can be covered with a lid, that is held in place through a threaded connection. Cosby '576 claims that the toilet seat can be transported in a vehicle, in operative position. The patent claims a strap-holding system at the lower, rear portion of the unit. The unit, itself, looks unacceptable to act as a car safety seat, according to current standards.

U.S. Pat. No. 6,430,758 by named inventor Cabrera, granted on Aug. 13, 2002, entitled "Portable training toilet" ("Cabrera '758"), discloses a miniature, plastic replica of a traditional toilet or commode. The portion is used for storage of baby wipes and other paraphernalia. Cabrera '758 teaches a training toilet with a fixed bowl. The entire device is unwieldy, and appears to only be portable in the most literal sense of the word, in that it is not intended to be fixed. The invention disclosed by Cabrera '758 fails to act as a convenience for a parent transporting a Potty-training Toddler.

U.S. Pat. No. 6,647,560 by named inventors Hingley, et. al., issued on Nov. 18, 2003, entitled "Collapsible portable potty trainer" ("Hingley '535"), discloses a folding, portable training toilet. Hingley '535 teaches a device, which has no back support, that has a flexible seat. The device can be folded, because its legs are fixed together, as pairs. When in use, the each set of legs forms an "X". When folded, the legs are substantially parallel with one another. The device disclosed by Hingley '535 appears to be unwieldy, uncomfortable, and of suspect utility in Potty-training a Toddler. Moreover, Hingley '535 fails to act as a convenience for a parent transporting a Potty-training Toddler.

U.S. Pat. No. 7,047,573 by named inventor Young, issued on May 23, 2006, entitled "Super collapsible and compactable portable potty trainer" ("Young '573), discloses a device, made from fabric or other flexible material, intended to fit over a standard toilet seat. Young '573 teaches a device intended to solve the problem of "children falling through the hole." "Young '573 provides a smaller opening for a Toddler who is Potty-training, and, presumably, would reduce some of the anxiety associated with Potty-training. However, Young '573 fails to act meet the need of a parent transporting a Potty-training Toddler. The invention disclosed by Young '573 requires access to a standard toilet, something which is not always immediately available during the transporting of a Toddler.

U.S. Pat. No. 7,290,296 by named inventor Wilson, issued on Nov. 6, 2007, entitled, "Portable travel potty" ("Wilson '296") discloses a portable commode, intended to Potty-train a Toddler, fabricated from plastic. Wilson '296 has four collapsible legs and an inner ring with a handle. The inner ring is intended to hold a bag, which would collect the Toddler's waste. Wilson '296 folds up into a thin profile, approximately the size of two standard toilet seat, for transport. The invention disclosed by Wilson '296 requires that the device be transported everywhere the Toddler is, that an auxiliary bag provided for the collection of waste, and that the bag be disposed of after use.

U.S. Pat. No. 7,334,273 by named inventor Thomas, issued on Feb. 26, 2008, entitled, "Portable popup potty and disposable bag" ("Thomas '273") discloses a portable commode, intended to Potty-train a Toddler, fabricated from plastic. Thomas '273 folds into a thin profile, to fit in a carrying case. Waste is, again, collected in a bag. The bag fits through the hold in the potty, and the bag has a flange that, optionally, can extend over the seat to act as a seat liner. The invention disclosed by Thomas '273 requires the device to be transported with the Toddler, folded for carry, unfolded for use, and fitted with a collection bag.

U.S. Pat. No. 8,201,284, by named inventor Pokorski, entitled, "Portable toilet" ("Porkorski '284") teaches a portable commode, intended for use in Potty-training a Toddler. Porkorski '284 is comprised of a series of nested plastic pieces that collapse for storage. When expanded, the plastic pieces have increasing radius with height. The unit comes with a bar that keeps the commode from collapsing while the Toddler is using it. Porkorski '284 discloses a device that can be fitted with a bag for waste collection. Porkorski '284 requires the device be transported with the Toddler, and requires set-up and break-down. Porkorski '284 also requires that the waste bag be disposed of immediately after use.

SUMMARY OF THE INVENTION

The present invention improves and expands upon the current prior art by teaching a potty that can be integrated into a car safety seat or a stroller.

In one form, the invention discloses a potty integrated into a child safety seat. The invention teaches a molded plastic child safety seat comprised of a two sides, a back and a base. The two sides are comprised of a small wall extending upwards a small distance, a connector piece, and an arm rest. The back is comprised of a upper and lower portion. The sides, back and base are a single, unitary, piece and are made of rigid construction. The hard plastic of the child safety seat can be covered with a soft material and padding.

The base is comprised of a top surface, a bottom surface, two sides, a front and a back. The top surface, bottom surface, side surfaces, front and back of the base define a volume. Interior to the volume is a collection apparatus for waste. The waste collection apparatus is comprised of a top surface, a bottom surface, two sides, a front and a back. The waste collection apparatus is fabricated from plastic. The waste collection apparatus is suitably sealed so that it can be immersed in water. The waste collection apparatus may be removed from the base by pressing a release mechanism and sliding it out of the base. The waste collection apparatus has an integral bowl, in which solid or liquid waste can be collected.

The top surface of the base is in intimate contact with the waste collection apparatus. The top surface of the base has a lid. When the lid is in the closed position, the top surface of the base, itself, defines the seating surface for the Toddler. The lid and surrounding top surface of the base can be covered in matching fabric and padding, to make the seat comfortable for travel. The lid can be fabricated in a number of ways, to allow access to the inner volume of the base. The lid can be hinged along the edge closest to the back. The lid can be removeable. The lid can be segmented, allowing it to slide into a second position, allowing an opening to be created in the top surface of the base.

Below the lid is a rim with an aperture or opening. The rim defines an aperture that opens, exposing the collection bowl of the waste collection apparatus. When the lid is open, the rim defines a surface on which a Toddler may sit. The Toddler may evacuate through the opening in the rim, depositing liquid or solid waste in the collection bowl.

The waste collection apparatus is removable from the side of the child seat. The waste collection apparatus waste collection bowl will be sized to hold, and retain, waste collection bags. The waste collection bags will be sealable.

The back of the child safety seat has a lateral aperture through which a safety belt can be connected, anchoring the integral child safety seat in accordance with current law and best practices. Additionally, the back of the child safety seat has a strap with a standard j-hook connector, for further anchoring the child safety seat.

In an alternative embodiment, the invention discloses a potty integrated into a child's stroller. The invention teaches a seat portion comprised of a molded, integral, plastic seat, which, itself, is comprised of a two sides, a back and a base. The two sides are comprised of a small wall extending upwards a small distance, a connector piece, and an arm rest. The back is comprised of a upper and lower portion. The sides, back and base are a single, unitary, piece and are made of rigid construction. The hard plastic of the seat can be covered with a soft material and padding. The seating portion is connected to handle bars and wheels.

The base is comprised of a top surface, a bottom surface, two sides, a front and a back. The top surface, bottom surface, side surfaces, front and back of the base define a volume. Interior to the volume is a collection apparatus for waste. The waste collection apparatus is comprised of a top surface, a bottom surface, two sides, a front and a back. The waste collection apparatus is fabricated from plastic. The waste collection apparatus is suitably sealed so that it can be immersed in water. The waste collection apparatus may be removed from the base by pressing a release mechanism and sliding it out of the base. The waste collection apparatus has an integral bowl, in which solid or liquid waste can be collected.

The top surface of the base is in intimate contact with the waste collection apparatus. The top surface of the base has a lid. When the lid is in the closed position, the top surface of the base, itself, defines the seating surface for the Toddler. The lid and surrounding top surface of the base can be covered in matching fabric and padding, to make the seat comfortable. The lid can be fabricated in a number of ways, to allow access to the inner volume of the base. The lid can be hinged along the edge closest to the back. The lid can be removeable. The lid can be segmented, allowing it to slide into a second position, allowing an opening to be created in the top surface of the base.

Below the lid is a rim with an aperture or opening. The rim defines an aperture that opens, exposing the collection bowl of the waste collection apparatus. When the lid is open, the rim defines a surface on which a Toddler may sit. The Toddler may evacuate through the opening in the rim, depositing liquid or solid waste in the collection bowl.

The waste collection apparatus is removable from the side of the child seat. The waste collection apparatus waste collection bowl will be sized to hold, and retain, waste collection bags. The waste collection bags will be sealable.

BRIEF DESCRIPTION OF THE DRAWINGS

Drawings

FIG. 1 is a perspective drawing of the left-side of the invention, with the lid concealing the waste collection bowl.

FIG. 2 is a reverse angle perspective drawing of the right-side of the invention, with the lid concealing the waste collection bowl.

FIG. 3 is a perspective drawing of the left-side of the invention, with the lid recessed, exposing the waste collection bowl.

FIG. 4 is a perspective drawing of the left-side of the invention, with the waste collection apparatus removed. FIG. 4A is an iso of the waste collection apparatus with a liner insert.

FIG. 5 is a perspective drawing of the back of the invention.

FIG. 6 is a perspective left-side drawing with the waste collection apparatus removed from the base.

DETAILED DESCRIPTION OF THE PREFERRED EMBODIMENTS

The following descriptions are not meant to limit the invention, but rather to illustrate its general principles of operation. Examples are illustrated with the accompanying drawings. A variety of drawings are offered, showing the present invention incorporated into a variety of charging cords.

Figure 1:
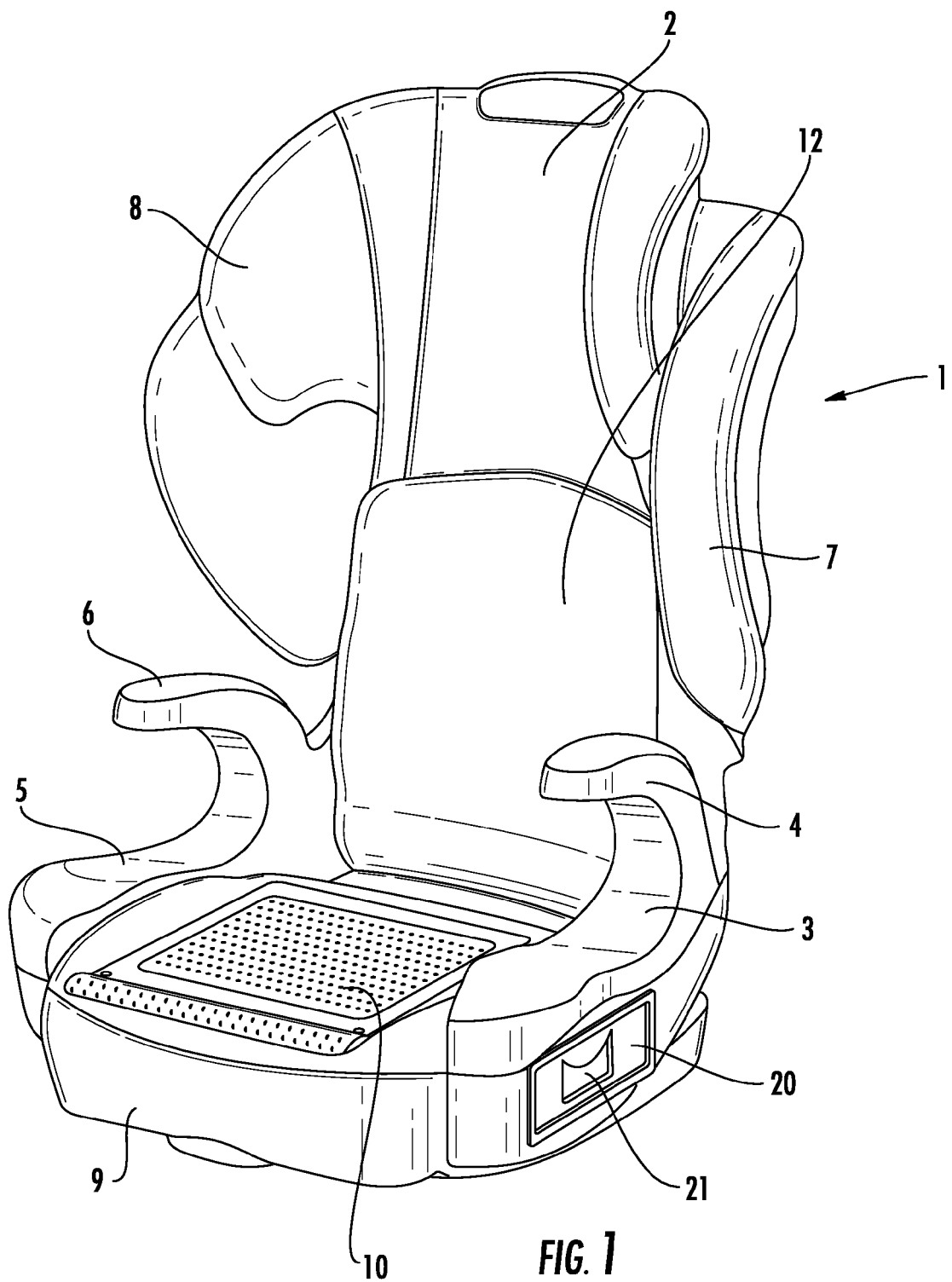
FIG. 1-5 show the invention practiced with a child safety seat.

FIG. 1 shows the present invention, an integral potty and child safety seat 1. The seat is defined by a base 9, a left side 3, a left arm 4, a right side 5, and a right arm 6, and a back 2. A waste collection apparatus 20 is integral to the construction. The seat may come with cushioning for comfort. FIG. 1 shows a lower cushion 12, an upper cushion 8, and a side cushion 7. The top surface of the base 9 is covered with a lid 10. The top surface of the base 9 defines the intended seating surface for a Toddler or user of the invention 1.

Figure 2:
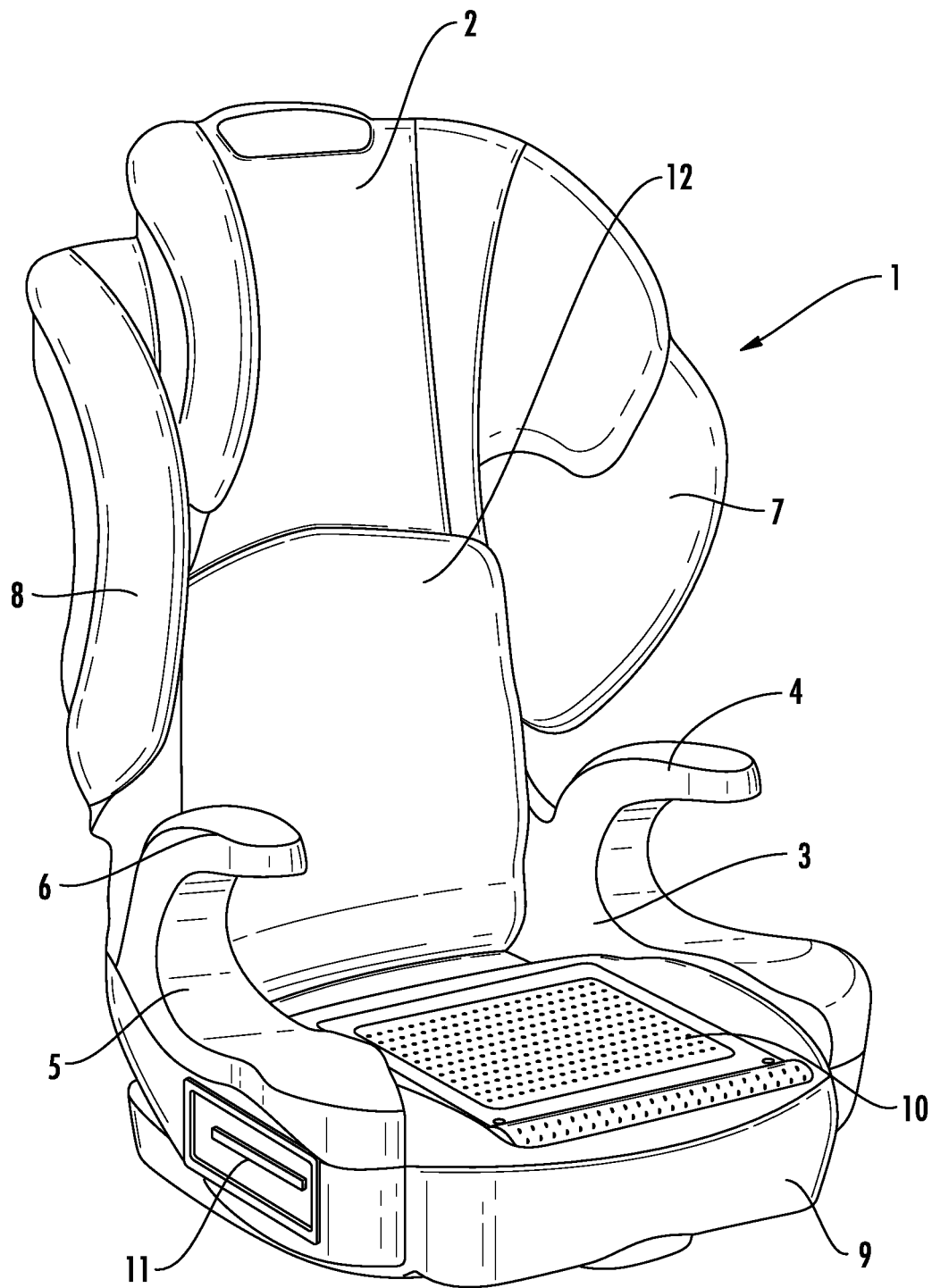

FIG. 2 shows the reverse angle of the present invention, an integral potty and child safety seat 1. The seat is defined by a base 9, a left side 3, a left arm 4, a right side 5, and a right arm 6, and a back 2. A cap 11 covers the waste storage opening 20. The seat may come with cushioning for comfort. FIG. 2 also shows a lower cushion 12, an upper cushion 6, and a side cushion 7. The top surface of the base 9 is covered with a lid 10.

Figure 3:
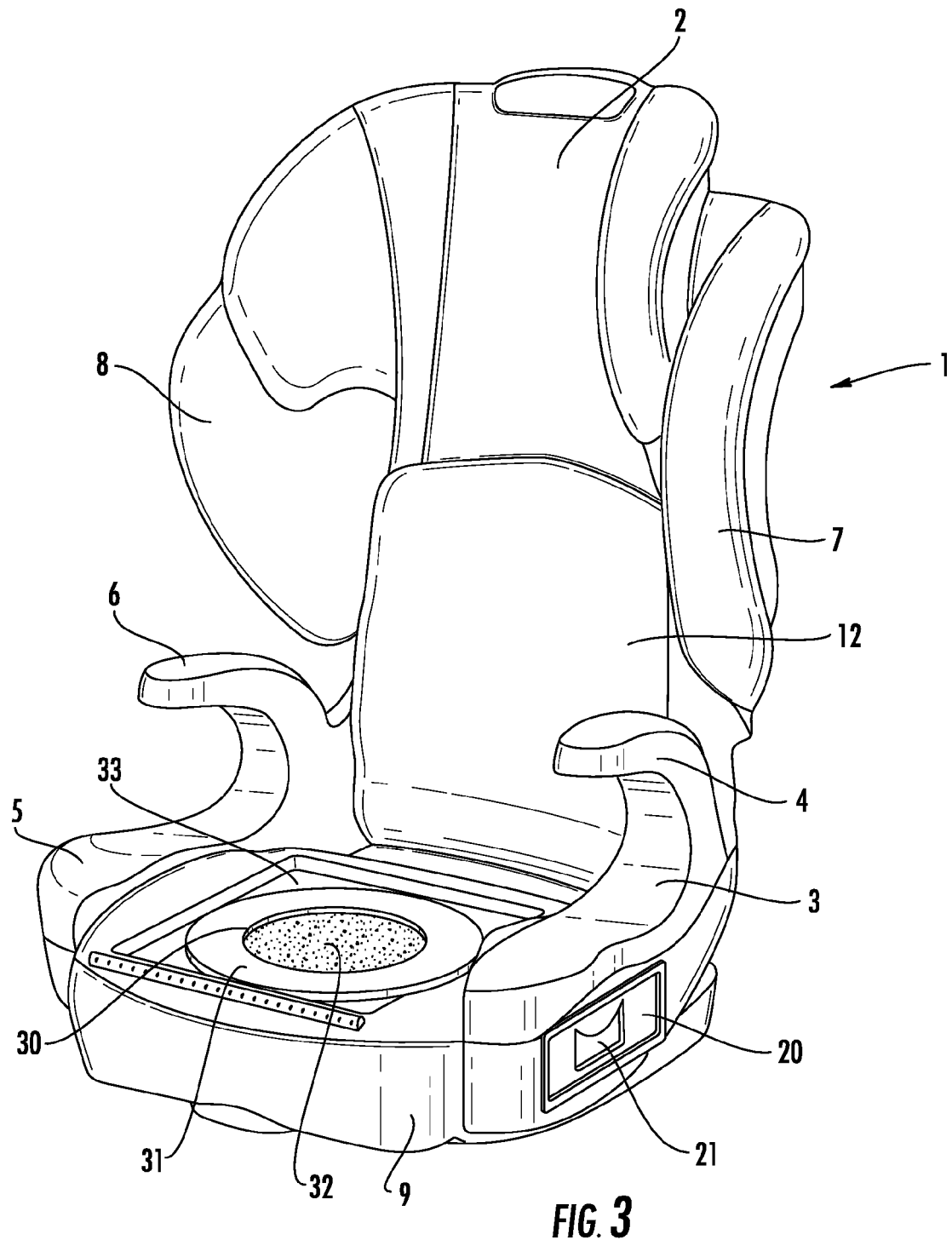

FIG. 3 shows the present invention, an integral potty and child safety seat 1, with the lid 10 retracted. The waste collection apparatus 20 is exposed when the lid 10 is retracted. The waste collection apparatus 20 has a release lever or button 21, a waste collection bowl 32, and a base 33. With the lid 10 retracted, the rim 31 defines the intended seating surface for a Toddler or user of the invention. A Toddler or user may evacuate his or her bowels or bladder, with the waste passing through the rim 31 and into the waste collection bowl 32.

Figure 4:
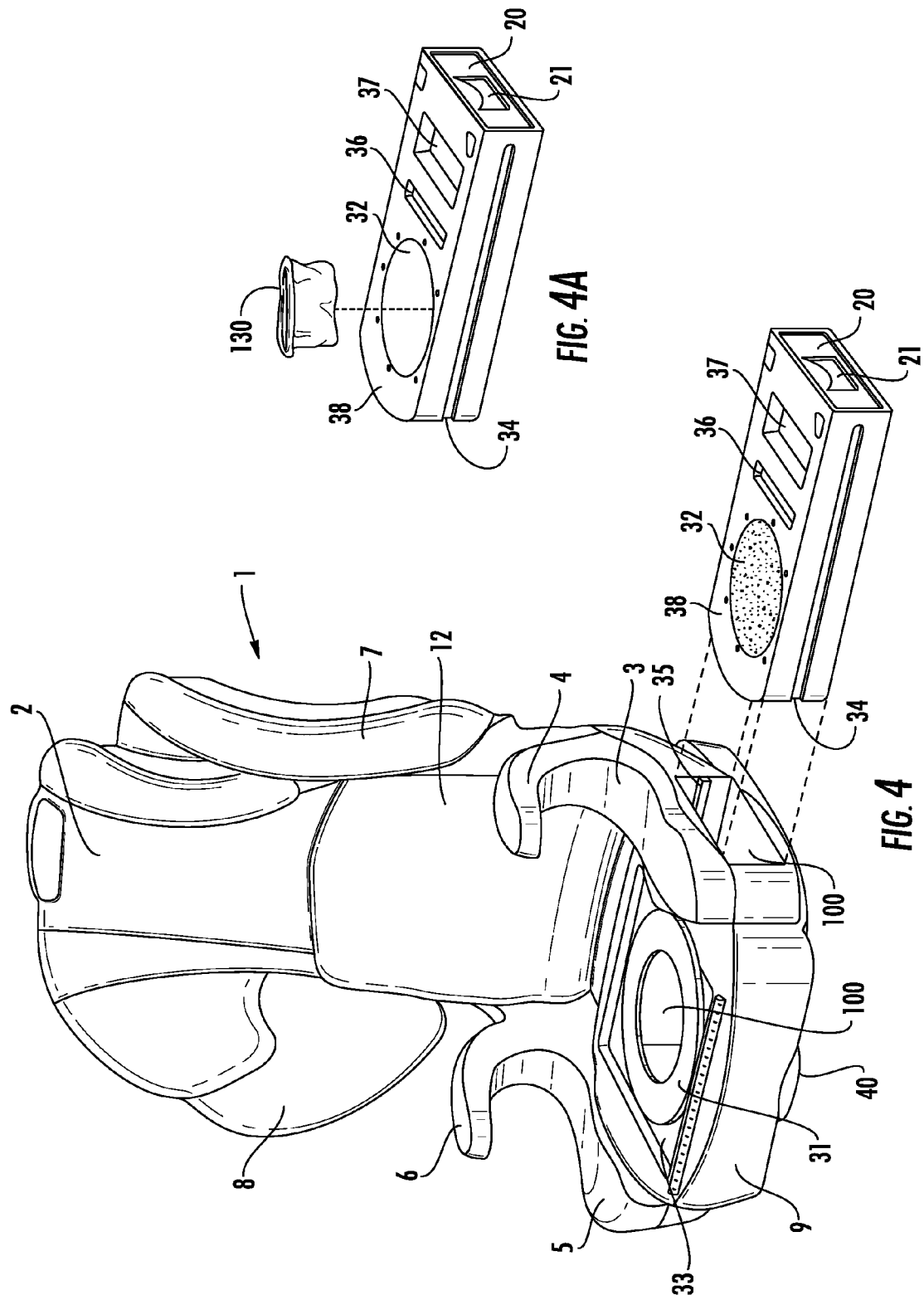

FIG. 4 shows the present invention with the waste collection apparatus 20, removed. Shown are the elements of the child safety seat: the base 9, left side 3, left arm 4, right side 5, right arm 6, back 2, along with the lower cushion 12, the upper cushion 6, and the side cushion 7. The waste collection apparatus 20 has a top surface 38. The waste collection bowl 32 is in the top surface 38 of the waste collection apparatus 20. With the waste collection apparatus 20 removed, an interior volume 100 is revealed. A slider rail 35 within the interior volume 100 acts as a locating guide for situating the waste collection apparatus 20. A groove 34 in the waste collection apparatus 20 serves as a mating feature for the slider rail 35. The waste collection apparatus comes with storage features 36, 37, for typical child diapering needs like diaper wipes and ointment. The waste collection apparatus 20 is removed from the base 9, by means of a release lever or knob 21, or alternatively, 40. FIG. 4A shows the waste collection apparatus 20 in isolation. The groove 34, top surface 38, waste collection bowl 32, storage 36, 37, and release lever 21 are evident. An optional waste collection liner 130 is shown above the waste collection bowl 32.

Figure 5:
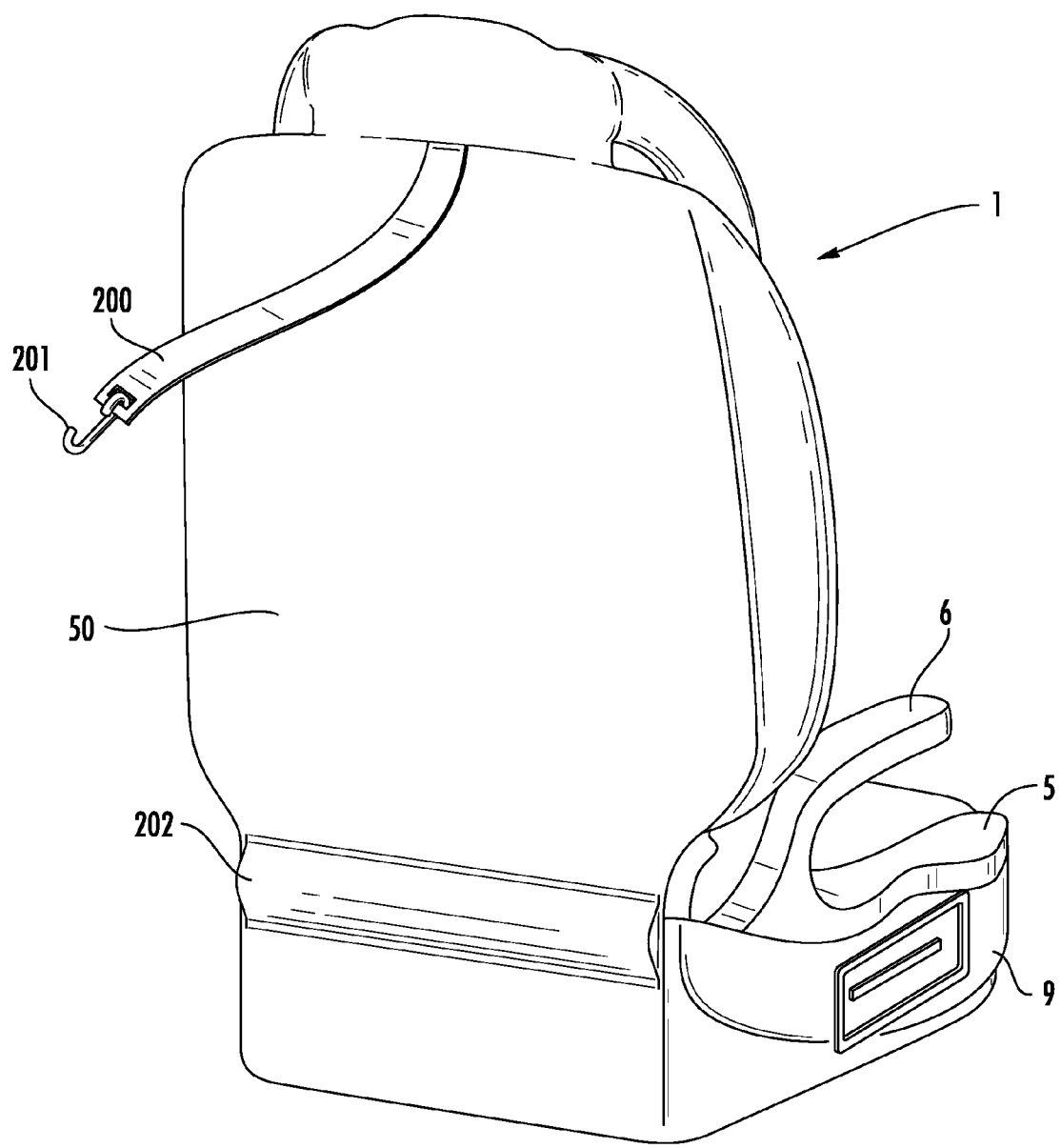

FIG. 5 shows the rear of the invention 1. The invention has a back surface 50. Attached at the top of the back surface 50 is an anchor strap 200, with a j-hook fastener 201. The anchor strap 200 and j-hook fastener 201 are intended to anchor the invention into a vehicle. The back surface 50 of the invention 1 also has an opening or aperture 202 through which a common automotive or light-truck vehicle safety seat belt may be buckled. Using the anchor strap 200, the j-hook connector 201, and a seat-belt buckled through the aperture 202, the present invention 1 can be suitably secured into a common automobile or light-truck.

Figure 6:
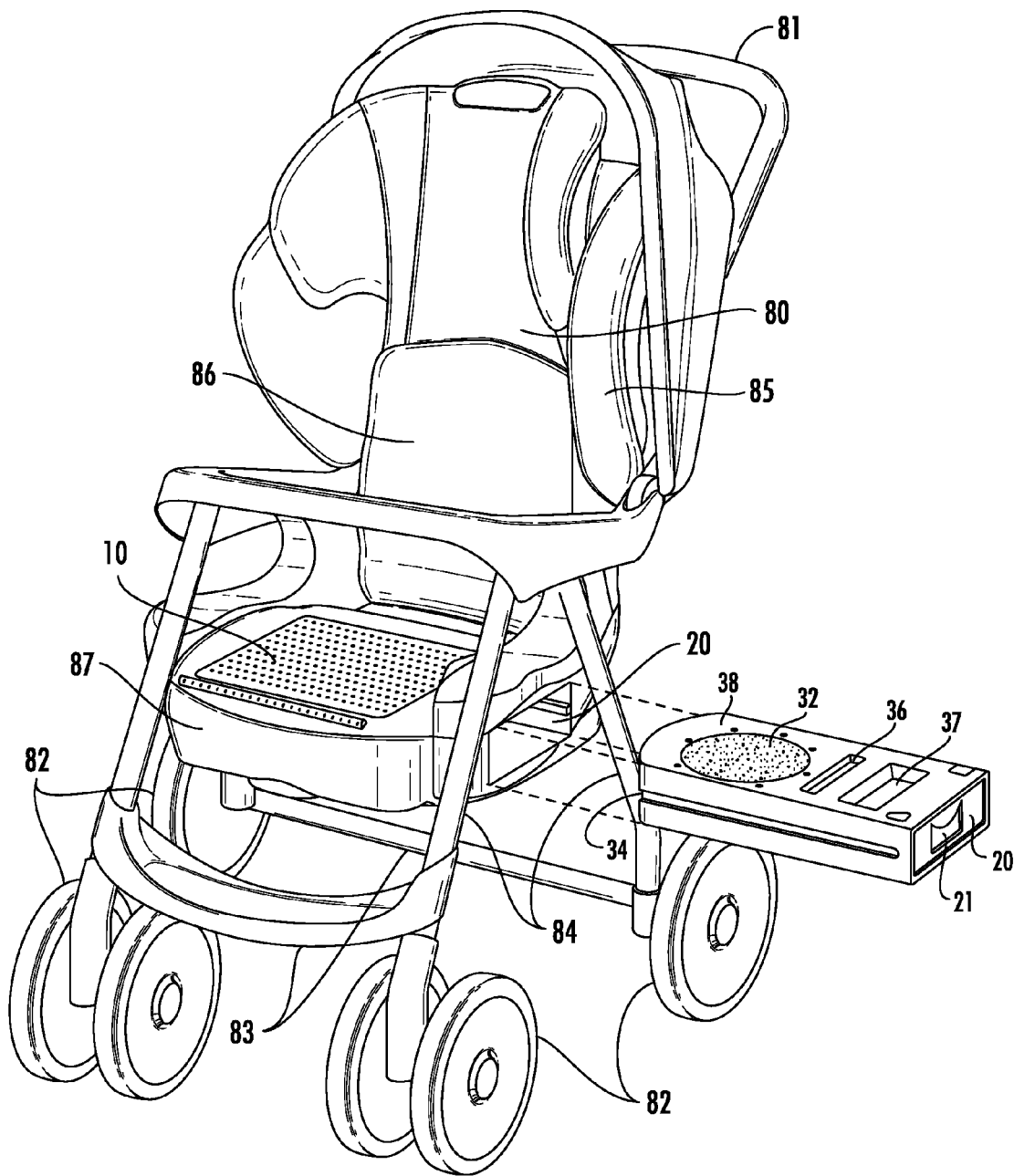
FIG. 6 shows the invention practiced with a stroller.

FIG. 6 shows an alternative embodiment of the present invention, with the waste collection apparatus 20 integrally fitted to a stroller. The seating portion of the stroller is defined by a base 87 and a back 80. For comfort, the seating portion may contain fabric-covered cushions 86, 85. A lid 10 covers the majority of the top surface of the base 87. The stroller has wheels 82, axles 83, a frame 84, and a handlebar 81. The waste collection apparatus 20 can be removed from the stroller by activating the release 21. In its top surface 38, the waste collection apparatus 20 has a waste collection bowl 32.

I claim:

1. An integral child safety seat and training potty, comprised of a molded seat portion and a waste collection apparatus portion; said molded seat portion being molded from plastic, with a defined back, left side, right side, and base, in which the base has a defined, rigid, top surface, bottom surface, front, back, and two sides; said base top surface, bottom surface, front, back and two sides defining an interior volume; said base top surface having an aperture, coverable with a lid; said aperture having a raised rim capable of supporting a seated child; said waste collection apparatus portion being comprised of a top surface, a bottom surface, a front surface, a back surface, and two side surfaces; said waste collection apparatus being sized to be slottedly received into the defined volume of said molded seat portion base, wherein the waste collection apparatus has a groove and the molded seat portion base has a slider-rail, through an opening, reversibly, on either the left or right lateral side of the molded seat base; said waste collection apparatus surface having a waste collection bowl that aligns with the aperture in the molded seat portion top surface; said waste collection apparatus having integral storage for diaper wipes and ointments; and said waste collection apparatus being removable from the integral child safety seat and training potty, by pulling a release lever, so that the contents of the waste collection bowl may be emptied and cleaned.

2. The invention described in claim 1, wherein said waste collection apparatus slides into and out of said molded seat base's interior volume on a rail-and-guide mechanism.

3. The invention described in claim 2, wherein the waste collection apparatus is held in place with a latch, or other retention mechanism, that, when activated, allows the waste collection apparatus to be removed from the base of the molded seat portion.

4. The invention described in claim 1, wherein a sealing gasket is intimate with both the waste collection apparatus and molded seat portions, sealing the waste collection bowl from the top surface of the waste collection apparatus.

5. The invention described in claim 1, wherein a plastic liner, capable of capturing and sealing waste, fits, intimately, in the waste collection bowl.

6. An integral child stroller and training potty, comprised of a frame and wheel structure, a molded seat portion and a waste collection apparatus portion; said frame and wheel structure having two pairs of wheels, connected with an axle, to a frame and said frame terminating in a handlebar; said molded seat portion being molded from plastic, with a defined back, left side, right side, and base, in which the base has a defined, rigid, top surface, bottom surface, front, back, and two sides; said base top surface, bottom surface, front, back and two sides defining an interior volume; said base top surface having an aperture, coverable with a lid; said aperture having a raised rim capable of supporting a seated child; said waste collection apparatus portion being comprised of a top surface, a bottom surface, a front surface, a back surface, and two side surfaces; said waste collection apparatus being sized to be slottedly received into the defined volume of said molded seat portion base, wherein the waste collection apparatus has a groove and the molded seat portion base has a slider-rail, through an opening, reversibly, on either the left or right lateral side of the molded seat base; said waste collection apparatus surface having a waste collection bowl that aligns with the aperture in the molded seat portion top surface; said waste collection apparatus having integral storage for diaper wipes and ointments; and said waste collection apparatus being removable from the integral child safety seat and training potty, by pulling a release lever, so that the contents of the waste collection bowl may be emptied and cleaned.

7. The invention described in claim 6, wherein said waste collection apparatus slides into and out of said molded seat base's interior volume on a rail-and-guide mechanism.

8. The invention described in claim 7, wherein the waste collection apparatus is held in place with a latch, or other retention mechanism, that, when activated, allows the waste collection apparatus to be removed from the base of the molded seat portion.

9. The invention described in claim 6, wherein a sealing gasket is intimate with both the waste collection apparatus and molded seat portions, sealing the waste collection bowl from the top surface of the waste collection apparatus.

10. The invention described in claim 6, wherein a plastic liner, capable of capturing and sealing waste, fits, intimately, in the waste collection bowl.

* * * * *